No. 738,693. Patented September 8, 1903.

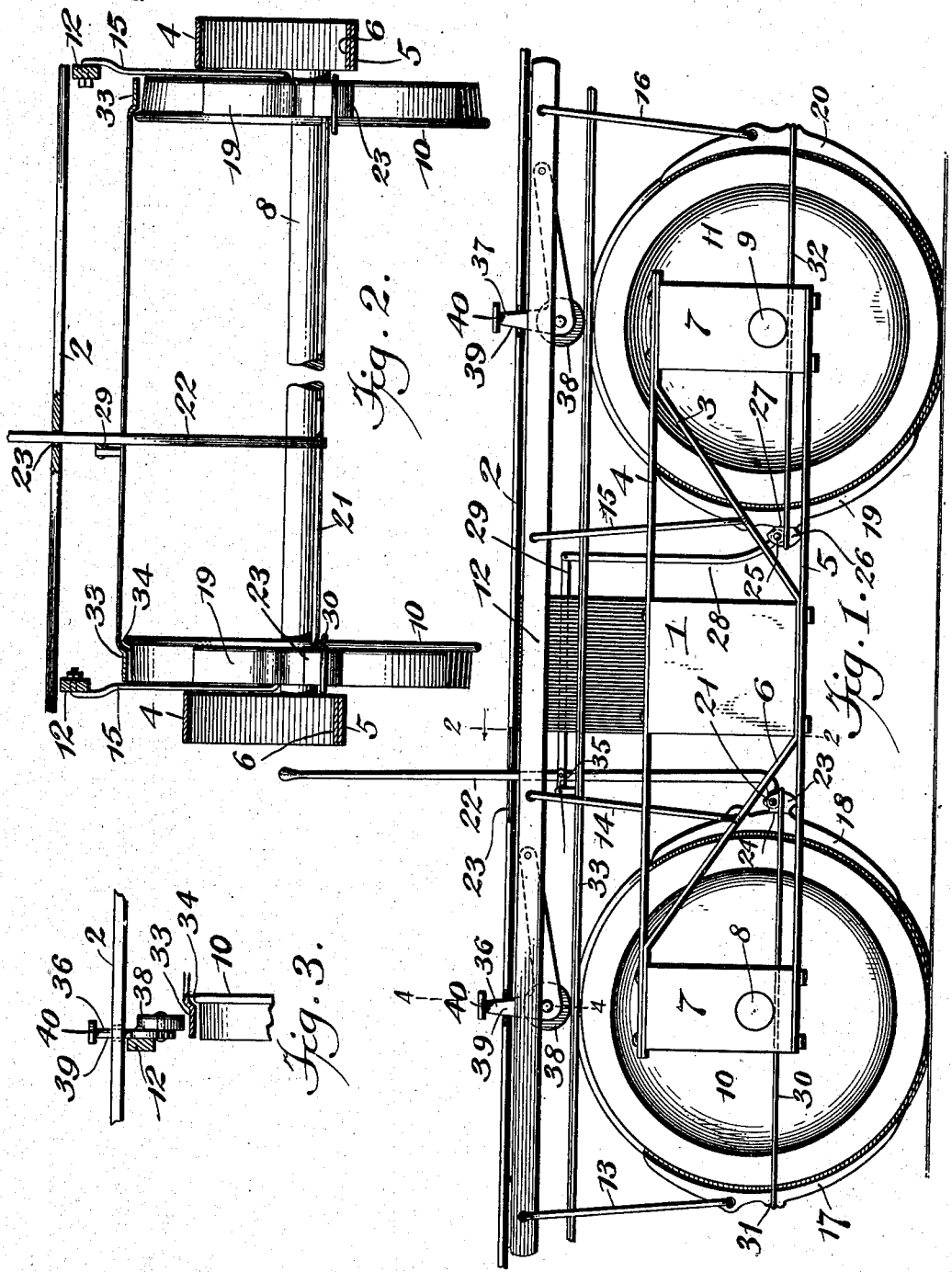

UNITED STATES PATENT OFFICE.

ANDREW R. MOORE, OF CHARLOTTE, MICHIGAN, ASSIGNOR OF ONE-HALF TO WILLIAM J. BYERS, OF CHARLOTTE, MICHIGAN.

CAR-BRAKE.

SPECIFICATION forming part of Letters Patent No. 738,693, dated September 8, 1903.

Application filed April 29, 1903. Serial No. 154,878. (No model.)

*To all whom it may concern:*

Be it known that I, ANDREW R. MOORE, a citizen of the United States, residing at Charlotte, in the county of Eaton and State of Michigan, have invented a new and useful Improvement in Car-Brakes, of which the following is a specification.

My invention relates to car-brakes, and has for its objects to produce a device of this character which will be comparatively simple of construction, efficient in operation, one in which the brake-shoes are moved into frictional contact with the wheel by mechanism actuated either by foot or hand levers, and one in which the motion of the car-wheels will when the foot-lever is actuated serve through suitable mechanism to move the shoes into braking position.

With these ends in view the invention comprises the novel details of construction and combination of parts more fully hereinafter described.

In the accompanying drawings, Figure 1 is a side elevation of a car-truck having my invention applied thereto. Fig. 2 is a vertical sectional elevation on the line 2 2 of Fig. 1. Fig. 3 is a similar view on the line 4 4 of said figure.

Referring to the drawings, 1 indicates the bolster of the car; 2, the platform sustained thereby; 3, the bolster-frame bolted or otherwise secured to the bolster and comprising an upper tie-bar 4, a lower tie-bar 5, and an intermediate arch-bar 6. Sustained by the bolster-frame, at opposite ends thereof, are journal-boxes 7, in which are journaled the ends of the front and rear axles 8 and 9, respectively, of the truck. Fixed to the front axle 8 are the front wheels 10 and to the rear axle rear wheels 11. These parts may all be of the usual or any desired construction and of any suitable material, inasmuch as they constitute no part of my invention.

12 indicates a hanger bar or member which in accordance with my invention is fixed in any suitable manner to stand upon edge beneath the platform 2 and to extend longitudinally thereof. This bar, which is of a length to extend slightly forward of the front wheels 10 and in rear of the rear wheels 11 of the truck, has pivoted to it the upper ends of a pair of links 13 and 14, which depend from the hanger-bar in front and rear, respectively, of the front wheel 10 and a second pair of links 15 and 16, which likewise depend from the bar in front and rear, respectively, of the rear wheel 11. Pivotally suspended from the links 13 14 are brake-shoes 17 18, which lie at opposite sides of the wheel 10, and from the links 15 16 there are suspended similar shoes 19 20, which lie at opposite sides of the wheel 11. These shoes, which normally lie in non-engagement with the wheels, are operable for engagement in pairs with their respective wheels to frictionally engage and brake the same in a manner presently described.

21 indicates a rock-shaft which extends transversely of the truck and is journaled in suitable bearings and is rocked in its bearings by means of a main lever 22, which extends upward through a longitudinal slot 23, formed in the platform 2, and is provided with a suitable hand-grip or handle. This lever, when shoved either forwardly or backwardly, serves to rock the shaft 21 and operate cam-blocks 23, which are fixedly associated with the ends of the shaft and which when the shaft is rocked coöperate with a cam surface or portion 24 of the shoe 18 for moving the latter into frictional engagement with the wheel 10.

25 is a transverse rock-shaft similar to shaft 21, which is journaled in suitable bearings and has fixed upon its ends cam-blocks 26, which coöperate with a cam-surface 27 on the shoe 19 for moving the latter into frictional engagement with the wheel 11. The shaft 25 is rocked simultaneously with the shaft 21 for moving the brake-shoes 18 19 into simultaneous engagement with their respective wheels by means of a supplemental lever 28, connected by link 29 with the lever 22 and operable thereby in the manner which will be readily understood.

When the shoe 18 is moved into engagement with the wheel 10 in the manner above described, the companion shoe 17 will be moved into simultaneous engagement with said wheel through the medium of a link 30, preferably in the form of a rectangular frame which embraces the wheel 10 and brake-shoes 17 18 and which at its front end engages a recess 31, formed transversely at the outer face of the shoe 17 and at its rear end is in similar engagement with the cam-block 23. The shoes 19 20 are connected for simultaneous movement by means of a link 32, which is similar in form to the link 30 and is in like engagement with the shoe 20 and cam-block 26.

From this construction it will be seen that when the lever 22 is manipulated all of the brake-shoes will be brought into frictional engagement with their respective wheels simultaneously, thus positively and quickly checking the speed of the car or instantaneously stopping the same, according to the amount of power applied to the lever. In this connection attention is directed to the fact that owing to the peculiar shape of the cam-blocks 23 26, as clearly shown in Fig. 1, they will act to move the shoes into braking position whether the lever 22 be shoved forward or pulled backward.

To provide for the brakes being applied by means of foot-operated levers and for the moving wheels serving to draw the brake-shoes into forcible engagement with the wheels, I mount beneath the platform 2 and just over the wheels, for free sliding movement longitudinally, a friction-plate 33, which is of a width equal to the width of the wheels and is provided with a longitudinal groove 34, formed to receive the wheel-flanges and permit the lower face of the plate moving into frictional engagement with the tread of the wheel. The plate 33 has connected to it by means of a link 35 the link 29, and when the plate 33 is moved longitudinally in either direction, owing to frictional contact with the rotating wheels, the link 29 will be moved in the same direction, thus actuating the levers 22 28 to cause them through the medium of their intermediate mechanisms to move the brake-shoes into braking position. The plate 33 is moved into frictional contact with either the wheel 10 or 11 by means of foot-levers 36 37, respectively. Each of these levers, which are pivoted to the hanger-bar 12, is provided with a wheel or roller 38, which bears upon the upper face of the plate 33 in vertical alinement with the center of the car-wheel, the lever being operated for causing its roller 38 to press the plate 33 downward upon the car-wheel by means of a vertical arm or stem 39, which extends upward through the platform 2 and has a foot-piece 40 associated with its upper end. When pressure is applied by the foot to the lever 36, the roller 38 presses the plate 33 downward upon the car-wheel, and the latter, owing to its rotary motion, moves the plate longitudinally in the direction of rotation of the wheel and actuates the mechanism for applying the brakes in the manner above described.

From the foregoing it will be seen that I produce a comparatively simple device which in practice will admirably perform its functions to the ends in view, and in attaining these ends it is to be understood that I do not limit myself to the precise details herein shown and described, inasmuch as minor changes may be made therein without departing from the spirit of my invention.

Having thus described my invention, what I claim is—

1. In a car-brake, the combination with the wheels of a car, of movable brake-shoes associated therewith, a pair of rock-shafts journaled one adjacent to each of said wheels, means for simultaneously rocking the shafts forwardly or backwardly, and cam-blocks associated with the shafts and operating upon the brake-shoes to move them into engagement with the respective wheels when the shafts are rocked in either direction.

2. In a car-brake, the combination with the truck having front and rear wheels, of a hanger-bar associated with the truck, a pair of oppositely-disposed brake-shoes for each wheel suspended from the hanger-bar and operatively connected for simultaneous movement, a pair of rock-shafts journaled one adjacent to each of the wheels and provided with means for moving the brake-shoes into engagement with their respective wheels, and means for simultaneously rocking the shafts.

3. In a car-brake, the combination with the front and rear wheels of a truck, of movable brake-shoes associated therewith, a pair of rock-shafts journaled one adjacent to each of said wheels and provided with cam members operable for moving the brake-shoes into engagement with their respective wheels, operating-levers for the rock-shafts operatively connected for simultaneous movement, a longitudinally-movable friction-plate operatively connected with the levers, and means for moving the plate at will into frictional engagement with the wheels.

In testimony that I claim the foregoing as my own I have hereto affixed my signature in the presence of two witnesses.

ANDREW R. MOORE.

Witnesses:
MERLIN C. PISCH,
H. C. CARR.